United States Patent [19]

Berger et al.

[11] 4,200,585

[45] Apr. 29, 1980

[54] ACID ESTERS OF PROPYLENE OXIDE POLY-ADDUCTS

[75] Inventors: Alfred Berger, Reinach; Hans-Ulrich Berendt, Allschwil, both of Switzerland

[73] Assignee: Ciba-Geigy Corporation, Ardsley, N.Y.

[21] Appl. No.: 920,588

[22] Filed: Jun. 29, 1978

Related U.S. Application Data

[63] Continuation of Ser. No. 685,585, May 12, 1976, abandoned.

[30] Foreign Application Priority Data

Jun. 4, 1975 [CH] Switzerland .......................... 7173/75

[51] Int. Cl.$^2$ ............................................. C07C 141/08
[52] U.S. Cl. .................................... 260/458 R; 8/169; 8/172 R; 8/173; 560/151
[58] Field of Search ..................................... 260/458 R

[56] References Cited

U.S. PATENT DOCUMENTS

| | | | |
|---|---|---|---|
| 2,763,529 | 9/1956 | Albrecht et al. | 260/458 R |
| 3,894,070 | 7/1975 | Tomiyama et al. | 260/458 R |

FOREIGN PATENT DOCUMENTS

| | | | |
|---|---|---|---|
| 898499 | 6/1962 | United Kingdom | 260/458 R |
| 902374 | 8/1962 | United Kingdom | 260/458 R |
| 1087635 | 10/1967 | United Kingdom | 260/458 |

OTHER PUBLICATIONS

Kubota et al., Chem. Abstract, 81, 137,5172 (1974).

*Primary Examiner*—Nicky Chan
*Attorney, Agent, or Firm*—Prabodh I. Almaula

[57] ABSTRACT

Acid esters of propylene oxide poly-adducts and their salts, which are obtained by an addition reaction of
(a) propylene oxide with
(b) a polyfunction amine, which contains 2 to 9 carbon atoms and at least a second reactive amino group or at least one hydroxyl group, and esterification of the poly-adduct with
(c) an oxy-acid which is at least dibasic or with a functional derivative of this acid and, if appropriate, by conversion of the resulting acid ester into a salt.

These acid esters of propylene oxide poly-adducts are particularly effective as dyeing auxiliaries, especially as dispersing and levelling agents for dyeing synthetic fibres and primarily for dyeing linear polyester fibres.

9 Claims, No Drawings

ACID ESTERS OF PROPYLENE OXIDE POLY-ADDUCTS

This is a continuation of application Ser. No. 685,585 filed on May 12, 1976, now abandoned.

The present invention relates to new acid esters of propylene oxide poly-adducts, a process for their manufacture and their use as dyeing auxiliaries when dyeing synthetic fibres or materials containing such fibres with dyestuffs which are insoluble or sparingly soluble in water.

When textile materials are dyed with dyestuffs which are insoluble or sparingly soluble in water, for example by the so-called high-temperature circulation dyeing method, dispersion difficulties, which are due to inadequate fine distribution of the dyestuffs in the dye liquors, frequently arise. As a result, dyeings which are uneven and not fast, above all not fast to rubbing, are obtained. Defects of this type are noticeable, inter alia, when synthetic fibres, especially the linear polyester fibres, are dyed with disperse dyestuffs.

As is known, certain auxiliaries, such as, for example, condensation products obtained from naphthalenesulphonic acid and formaldehyde or their alkali metal salts, oxyethylated fatty alcohols or ligninsulphonates, can be added to the dye baths in order to stabilise the dispersions of dyestuffs which are sparingly soluble in water.

However, these products possess either only dispersing properties or only levelling properties. Therefore, the two effects can be achieved simultaneously only by using mixtures of different auxiliaries. Due to their high tendency to foaming, many dispersing agents also impair the dispersion and dyeing process.

New dyeing auxiliaries have now been found which enable level dyeings which are fast to rubbing to be obtained when materials containing synthetic fibres are dyed with dyestuffs which are sparingly soluble to insoluble in water.

The new auxiliaries are acid esters of propylene oxide poly-adducts and their salts, which have been manufactured by an addition reaction of (a) propylene oxide with (b) a polyfunctional amine, which contains 2 to 9 carbon atoms and at least a second reactive amino group or at least one hydroxyl group, and esterification of the poly-adduct with (c) an oxyacid which is at least dibasic or with a functional derivative of this acid and, if appropriate by conversion of the resulting acid ester into a salt.

The new products can be present as free acids or as salts, for example alkali metal salts or ammonium salts. Alkali metal salts which may be mentioned are, in particular, the sodium and potassium salts, and ammonium salts which may be mentioned are the ammonium trimethylammonium, monoethanolammonium, diethanolammonium and triethanolammonium salts. The poly-adducts are preferably manufactured as ammonium salts.

The new acid esters are derived from poly-adducts which are obtained from the components (a) and (b) and which appropriately have an average molecular weight of 1,000 to 6,000, preferably 3,000 to 5,000. Poly-adducts of this type can be manufactured, for example, by an addition reaction of about 15 to 100 mols, preferably about 50 to 85 mols, of propylene oxide (a) with one mol of the component (b). Poly-adducts which have an average molecular weight of 2,000 to 4,000 are also preferred.

The new acid esters of propylene oxide poly-adducts are manufactured by subjecting (a) propylene oxide to an addition reaction with (b) a polyfunctional amine which contains 2 to 9 carbon atoms and at least a second reactive amino group or at least one hydroxyl group and converting the addition product into the acid ester using (c) an oxy-acid which is at least dibasic, or a functional derivative of this acid, and optionally converting the resulting acid ester into the abovementioned salts.

Possible amines, which, as starting materials, can be reacted with propylene oxide, are, in principle, polyfunctional amines which contain either at least two reactive amino groups or at least one reactive amino group and one hydroxyl group, it being possible for the reactive amino groups to be primary and/or secondary. Amines which have proved suitable are, above all, alkylene polyamines which contain 2 to 6 carbon atoms and 2 to 4 amino groups. Polyfunctional alkyleneamines which can be used are, for example, ethylenediamine, propylenediamine, butylenediamine, pentylenediamine, hexamethylenediamine, diethylenetriamine, triethylenetetramine, 1,2-propylenediamine, dipropylenetriamine, tripropylenetetramine and dibutylenetriamine. Preferred polyamines are alkylenediamines with 2 or 3 carbon atoms, such as propylenediamine and especially ethylenediamine.

Amines which have 2 to 6 carbon atoms and contain at least one hydroxyalkyl group, for example hydroxyalkylamines, such as $\beta$-hydroxyethylamine, $\beta$- or $\gamma$-hydroxypropylamine or $\beta,\gamma$-dihydroxypropylamine; bis-hydroxyalkylamines, such as bis-($\beta$-hydroxyethylamine), bis-$\gamma$-hydroxypropylamine or bis-($\alpha$-methyl-$\beta$-hydroxyethyl)-amine; tris-hydroxyalkylamines, such as tris-($\beta$-hydroxyethyl)-amine and N-alkyl-N-hydroxyalkylamines, such as N-methyl- or N-ethyl-N-$\gamma$-hydroxypropylamine, also prove to be particularly valuable. N-Methyl-N-$\beta$-ethanolamine and, especially, tris-$\beta$-ethanolamine and $\beta$-ethanolamine are preferred.

Both the propylene oxide addition reaction and the esterification can be carried out according to known methods.

Polybasic oxy-acids which can be used to form the new acid esters are sulphonated organio, preferably aliphatic, mono- or di-carboxylic acids with 3 to 6 carbon atoms, such as, for example, sulphosuccinic acid, or, in particular, polybasic inorganic oxy-acids, such as sulphuric acid. In place of the acids it is also possible to use their functional derivatives, such as acid anhydrides, acid halides, acid esters or acid amides. Chlorosulphonic acid and, especially, sulphamic acid may be mentioned as examples of these functional derivatives.

As a rule, the esterification according to the invention is carried out by simply mixing the reactants whilst warming, appropriately to a temperature between 50° and 100° C. The free acids which are first formed can then be converted into the corresponding alkali metal or ammonium salts. Conversion into the salts is carried out in the customary manner by adding bases, such as, for example, ammonia, monoethanolamine, triethanolamine or alkali metal hydroxides, for example sodium hydroxide or potassium hydroxide. According to a particularly preferred embodiment, the acid sulphuric acid esters are manufactured direct in the form of their ammonium salts by warming the propylene oxide addition products with sulphamic acid, appropriately in the presence of urea.

A typical representative of the new products is the ammonium salt of the sulphuric acid ester of an addition product which has been obtained from ethylenediamine and propylene oxide and which appropriately has an average molecular weight of 3,000 to 4,000, preferably 3,600.

A further representative which contains sulpho groups is the sulphosuccinic acid half-ester of a poly-adduct obtained by an addition reaction of propylene oxide and ethylenediamine, the poly-adduct advantageously having an average molecular weight of 3,000 to 4,000, preferably 3,600.

With the aid of the anioric poly-adducts described above it is now possible to eliminate the disadvantages which were described initially and which arise when organic synthetic fibres, especially polyester fibres, are dyed with disperse dyestuffs without the addition of an auxiliary or with the additives used hitherto. The technical advance depends, above all, on the excellent dispersion-stabilising action of the poly-adducts on the dyestuff, so that neither an aggregation nor a precipitation of the dyestuff takes place during the entire dyeing process.

A further advantage of these compounds, which are employed as levelling and dispersing agents, lies in the low tendency to foaming. Accordingly, there is no danger of froth stains forming on the dyeings and a more rapid penetration of the goods and an increase in the rate of flow in the dyeing machines are thus ensured.

The new acid esters of propylene oxide poly-adducts are used as dyeing auxiliaries, especially as dispersing and levelling agents, for dyeing synthetic fibres or materials containing such fibres and especially for dyeing linear polyesters.

The amounts in which the acid esters of the polypropylene oxide adducts, or their salts, are added to the dye baths vary between 0.1 and 5 g, preferably 0.5 to 2 g, per litre of the aqueous dye liquor.

It is frequently desirable to incorporate an anti-foaming agent into the aqueous solution of the acid ester in order to improve the properties of the dye bath, to which the dispersing agent is added, and sometimes also to increase the migration of the dyestuff. A satisfactory type of anti-foaming agent is a silicone emulsion, for example a 5 to 10% strength aqueous silicon emulsion, which can also be employed in combination with higher alcohols with 4 to 22 carbon atoms, especially with 2-ethyl-hexanol. However, the most suitable anti-foaming agents are water-insoluble alkylene oxide adducts of higher alcohols, for example the adduct of 1 mol of ethylene oxide with 1 mol of stearyl alcohol, and also esters of aliphatic dicarboxylic acids and the higher alcohols mentioned, or the higher alcohols on their own, for example n-butyl alcohol or 2-ethylhexanol.

Adipic acid di-2-ethyl-hexyl ester and also polysiloxanes, such as, for example, methylpolysiloxane, have proved very particularly suitable.

The amount in which the anti-foaming agent is employed can be as low as, for example, 0.5% by weight but is advantageously at least 10% by weight and preferably 15 to 60% by weight, based on the weight of the acid ester or its salt.

Water-miscible alcohols can also be added to the solution of the new acid ester. Alcohols which are suitable for this purpose are, in particular, lower aliphatic alcohols, such as alkanols, for example ethyl alcohol, n- and iso-propyl alcohol and tert.-butyl alcohol, alkylene glycols, for example ethylene glycol and 2,5-hexanediol and their lower monoalkyl ethers, as well as mixtures thereof.

Dyestuffs which are insoluble or sparingly soluble in water are to be understood as vat dyestuffs, organic pigments and, above all, disperse dyestuffs which have an affinity for the fibre, that is to say those which are absorbed on textile synthetic fibre materials.

The dyestuffs can belong to very diverse categories, for example acridone dyestuffs, nitro dyestuffs, methine and polymethine dyestuffs, styryl and azostyryl dyestuffs, xanthene dyestuffs, oxazine dyestuffs, aminonaphthoquinone dyestuffs, coumarin dyestuffs and, in particular, anthraquinone dyestuffs and azo dyestuffs, such as monoazo dyestuffs and disazo dyestuffs.

Mixtures of such dyestuffs can also be employed.

The new anionic poly-adducts can also be employed when whitening undyed textile materials with optical brighteners which are sparingly soluble in water.

The latter can belong to any desired categories of brightener. In particular they are stilbene compounds, coumarins, benzocoumarins, pyrazines, pyrazolines, oxazines, triazolyl, benzoxazolyl, benzofurane or benzimidazolyl compounds and naphthalic acid imides.

The amount of dyestuffs added to the liquor depends on the desired depth of colour; in general, amounts of 0.01 to 10 percent by weight, based on the fibre material employed, have proved suitable.

Examples which may be mentioned of fibre materials which can be dyed in the presence of the new adducts are cellulose ester fibres, such as cellulose 2½-acetate fibres and cellulose triacetate fibres, synthetic polyamide fibres, for example those made from ε-caprolactam, from adipic acid and hexamethylenediamine and from ω-aminoundecanoic acid, polyurethane fibres, polyolefine fibres, for example polypropylene fibres, polyacrylonitrile fibres, including modified acrylic fibres, and, above all, linear polyester fibres. Linear polyester fibres are to be understood as synthetic fibres which are obtained by a condensation reaction of terephthalic acid with ethylene glycol or of isophthalic acid or terephthalic acid with 1,4-bis-(hydroxymethyl)-cyclohexane, and also copolymers of terephthalic acid and isophthalic acid and ethylene glycol. The fibre materials can also be used as mixed fabrics with one another or with other fibres, for example mixtures of polyacrylonitrile/polyester, polyamide/polyester, polyester/viscose and polyester/wool.

The fibre material can be in very diverse stages of processing, for example in the form of flock, piece goods, such as woven fabrics and knitted fabrics, bundles of yarn or wound packages or as non-woven fabrics, a textile floor covering or a tufted carpet.

The dyeings are advantageously carried out from an aqueous liquor by the exhaustion process. Linear polyester fibres are preferably dyed by the so-called high-temperature process in closed pressure-resistant machines at temperatures of above 100° C., preferably between 110° and 140° C., under pressure.

Examples of suitable closed vessels are circulating liquor machines, such as cheese machines or beam dyeing machines, winches, jet dyeing machines or rotary-type dyeing machines, paddles or jiggers. The liquor ratio can accordingly be chosen within a wide range, for example 1:1 to 1:100, preferably 1:10 to 1:50. The linear polyester fibres can also be dyed at temperatures below 100° C., for example in the temperature range from 75° to 98° C., in the presence of the customary carriers, for example phenylphenols, polychlorobenzenes, benzenes, xylenes, toluenes, naphthalenes or diphenyl. Cellulose 2½-acetate fibres are preferably dyed at temperatures of 80°–85° C., whilst cellulose triacetate fibres are advantageously dyed at the boiling point (98° C.) of the aqueous bath.

The use of carriers is superfluous when dyeing cellulose 2½-acetate or polyamide fibres.

When preparing the dye liquors it is appropriate to start from aqueous solutions of the acid ester or its salt and to add suitable auxiliaries, such as, for example, anti-foaming agents and lower alcohols, to these. The liquors can contain mineral acids, such as, for example, sulphuric acid or phosphoric acid, organic acids, appropriately lower aliphatic carboxylic acids, such as formic acid, acetic acid or oxalic acid, and/or salts, such as ammonium acetate, ammonium sulphate or sodium acetate. The acids serve, above all, to adjust the pH value of the liquors which can be used according to the invention; as a rule, the pH value is 4 to 8 and preferably 4.5 to 6.5.

The textile material is introduced into the liquor, which can have a temperature of 40° to 70° C., and the material is treated for 5 to 15 minutes at this temperature. The dye-stuff and, where appropriate, the carrier are then added and the temperature of the liquor is raised in order to dye in the indicated temperature range for 50 to 100 minutes.

The dyed material is then rinsed, and dried, in the customary manner. A reductive after-treatment is normally not necessary.

It is important that a fine dispersion of the dyestuff is not only initially present but that the degree of dispersion is also maintained during the entire dyeing process. As is known, certain disperse dyestuffs tend, above all under the conditions of high-temperature dyeing, to convert into a less fine form. The result of this is that the dyestuff settles on the surface of the material to be dyed. Such agglomerations and deposits of dyestuff can be avoided particularly well by means of the anionic poly-adducts according to the invention.

The synthetic fibre material can also be dyed continuously, that is to say by impregnating with an aqueous formulation which contains a disperse dyestuff, an anionic poly-adduct according to the invention and, optionally, a thickener and an acid and squeezing off to the desired content of impregnating liquor of 60 to 120% of the weight of fibre and subsequently subjecting to a heat treatment, such as, for example, steaming at temperatures of 98° to 105° C. with neutral saturated stream or thermofixing at 180° to 210° C.

Uniform and deep dyeings, which additionally are distinguished by good fastness to rubbing and good dye yields, are obtained on synthetic organic fibre material, especially on linear polyester fibres, by the dyeing process according to the invention.

In the examples which follow percentages denote percentages by weight and parts denote parts by weight.

EXAMPLE 1

60 g of an adduct which was obtained from ethylenediamine and propylene oxide and has an average molecular weight of 3,600 are warmed to 60°–65° C. Subsequently, 7.2 g of urea are introduced in the course of 15 minutes and 7.2 g of sulphamic acid are introduced in the course of 30 minutes. The reaction mixture is stirred for a further 30 minutes at 60–65° C., then warmed to 95° C. in the course of 30 minutes and kept at 95°–110° C. for 6 hours. A product which is readily soluble in water and contains 90% of the ammonium salt of the acid sulphuric acid ester of the adduct is obtained. The product has a surface tension of 37.0 dyne/cm at 24° C.

EXAMPLE 2

5.2 g of maleic anhydride are introduced in the course of 15 minutes, at 60° C., into 46 g of a poly-adduct which was obtained from ethylenediamine and propylene oxide and has an average molecular weight of 3,600. The reaction mixture is then kept at 100° C. for 30 minutes and at 125° C. for 60 minutes. After cooling to 90°–100° C., a solution of 7.8 g of sodium sulphite in 54 g of water is added to the reaction product and the mixture is kept at 100° C. for a further 9 hours. A solution which contains 50% of the sodium salt of the sulphosuccinic acid ester of the abovementioned poly-adduct is obtained. The surface tension at 24° C. is 38.3 dyne/cm.

EXAMPLE 3

41.8 g of poly-adduct which was obtained from ethylenediamine and propylene oxide and has an average molecular weight of 1,020 are esterified as described in Example 1, using 18 g of sulphamic acid in the presence of 18 g of urea. The resulting product is readily soluble in water. The surface tension at 24° C. is 39.1 dyne/cm.

EXAMPLE 4

59 g of a poly-adduct which was obtained from ethylenediamine and propylene oxide and has an average molecular weight of 5,920 are esterified as described in Example 1, using 4.5 g of sulphamic acid in the presence of 4.5 g of urea, whereupon a product which is readily soluble in water is obtained. The surface tension at 24° C. is 35.4 dyne/cm.

EXAMPLE 5

46.6 g of a poly-adduct which was obtained from monoisopropanolamine and propylene oxide and has an average molecular weight of 2,330 are esterified as described in Example 1, using 6.4 g of sulphamic acid in the presence of 6.4 g of urea. A product which is readily soluble in water is obtained. The surface tension at 24° C. is 36.0 dyne/cm.

EXAMPLE 6

2.8 g of mono-β-ethanolamine and 60 g of benzene are added to 44.6 g of the product obtained according to Example 1. The benzene and ammonia are then driven off in vacuo, whereupon the monoethanolamine salt of the acid sulphuric acid ester of the adduct, of ethylenediamine and propylene oxide, with an average molecular weight of 3,600 is obtained. The surface tension at 24° C. is 36.4 dyne/cm.

EXAMPLE 7

29.6 g of the adduct of 1 mol of mono-β-ethanolamine and 50 mols of propylene oxide (average molecular weight 2,960) are warmed to 60°–65° C. After stirring vigorously, 6.5 g of urea are introduced in the course of 15 minutes and 6.5 g of sulphamic acid are introduced in the course of 30 minutes. The mixture is kept at 60°–65° C. for a further one hour, warmed to 90° C. in the course of 30 minutes and kept at 95°–100° C. for 6 hours. It is then cooled to 70° C. and 120 g of water are added to the reaction product. A solution which contains 20% of the ammonium salt of the acid sulphuric acid ester of the adduct is obtained. The surface tension at 24° C. is 37.2 dyne/cm.

EXAMPLE 8

The procedure is as described in Example 7 but 41.3 g of the adduct of 1,2-diaminopropane and 70 mols of propylene oxide (average molecular weight 4,130) and also 12.2 g of urea and 12.2 g of sulphamic acid are used. 160 g of water are then added to the reaction product, a 20% strength solution of the ammonium salt of the acid sulphuric acid ester being obtained. The surface tension at 24° C. is 36.2 dyne/cm.

EXAMPLE 9

The procedure of Example 7 is followed but 47.8 g of the adduct of triethylenetetramine and 80 mols of propylene oxide (average molecular weight 4,780) and also 18 g of urea and 18 g of sulphamic acid are used. 184 g of water are then added to the reaction product, whereupon a 20% strength solution of the ammonium salt of the acid sulphuric acid ester of the adduct is obtained. The surface tension at 24° C. is 35.7 dyne/cm.

EXAMPLE 10

The procedure is as described in Example 7 but 46.3 g of the adduct of tris-β-ethanolamine and propylene oxide (average molecular weight 4,630) and also 10.9 g of urea and 10.9 g of sulphamic acid are used. After carrying out the reaction, 178 g of water are added to the reaction product, whereupon a 20% strength solution of the ammonium salt of the acid sulphuric acid ester of the adduct is obtained. The surface tension at 24° C. is 36.1 dyne/cm.

EXAMPLE 11

The reaction is carried out according to the instructions in Example 7 but 48 g of the adduct of N-methyl-N-β-ethanolamine and 81 mols of propylene oxide (average molecular weight 4,800) and also 19 g of urea and 19 g of sulphamic acid are used. When the reaction has ended, 164 g of water are added to the reaction product, whereupon a 20% strength solution of the ammonium salt of the acid sulphuric acid ester is obtained. The surface tension at 24° C. is 35.5 dyne/cm.

EXAMPLE 12

25 g of a knitted fabric of polyethylene glycol terephthalate are treated, in a circulating liquor dyeing apparatus, at 60° C. for 10 minutes with a liquor which contjains 0.6 g of ammonium sulphate and 0.3 of a mixture of auxiliaries, consisting of 55 parts of the sulphuric acid ester obtained according to Example 1, 10 parts of adipic acid di-2-ethylhexyl ester and 35 parts of water and isopropanol (1:1), in 300 ml of water and has been adjusted to a pH of 5.5 with 85% strength formic acid. 0.625 g of a dyestuff of the formula

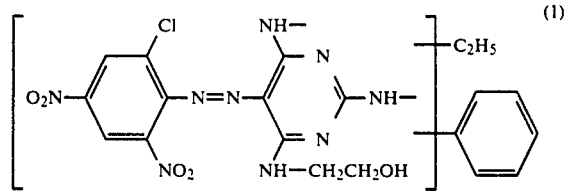

are then added to the liquor and the dye liquor is heated to 130° C. in the course of 30 minutes. Dyeing is carried out for 60 minutes at this temperature and the liquor is cooled to 90° C. The resulting dyeing is rinsed and dried. A level, brilliant, red dyeing which is fast to rubbing results.

Level dyeings are also obtained with the products according to Examples 2 to 11 when these are used in a corresponding amount in place of the product according to Example 1.

EXAMPLE 13

If, in Example 12, the mixture of auxiliaries mentioned in that example is replaced by 0.6 g of a product which contains 50 parts of the ammonium salt according to Example 1, 50 parts of water and 0.8 part of methylpolysiloxane in aqueous emulsion and in other respects the procedure is as described in Example 12, a level dyeing is again obtained.

Similarly good results are obtained when, in each case, one of the acid esters obtained according to Examples 2 to 11 is employed in place of the product prepared according to Example 1. Appropriately, preparations which contain about 20% of the sulphuric acid esters mentioned and 0.35% of methylpolysiloxane in aqueous emulsion are used and 1.38 g of these preparations are employed.

EXAMPLE 14

25 g of a knitted fabric of polyethylene glycol terephthalate, wound on a perforated metal support, are treated, in a circulating liquor dyeing apparatus, for 10 minutes at 60° C. with a liquor which contains 0.6 g of ammonium sulphate, 0.3 g of a mixture of auxiliaries, consisting of 55 parts of the sulphuric acid ester obtained according to Example 1, 10 parts of adipic acid di-2-ethyl-hexyl ester and 35 parts of water and isopropanol (1:1), and 1.5 g of a carrier of the trichlorobenzene/diphenyl type in 300 ml of water and has been adjusted to a pH of 5.5 with 85% strength formic acid. 0.625 g of a dyestuff of the formula (1) are then added to the liquor and the dye liquor is heated to 98° C. in the course of 30 minutes. Dyeing is carried out for 60 minutes at this temperature and the liquor is then cooled to 90° C. The resulting dyeing is rinsed and dried. A level, brilliant, red dyeing which is fast to rubbing and which shows no deposit of dyestuff on the inside of the support for the wound fabric results.

EXAMPLE 15

10 g of a textured polyethylene terephthalate fabric are treated, in a dyeing apparatus, for 10 minutes at 60° C. with a liquor which contains 0.24 g of ammonium sulphate and 0.24 g of the auxiliary according to Example 1 in 120 ml of water and has been adjusted to a pH of 5.5 with 85% strength formic acid. Subsequently, the liquor is heated to 135° C. in the course of 35 minutes and 0.018 g of a dyestuff of the formula

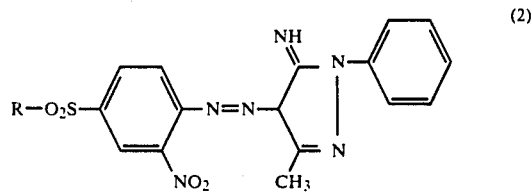

R=CH$_3$ and C$_2$H$_5$ (1:1),
0.015 g of a dyestuff of the formula

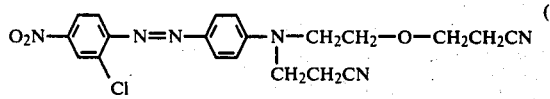

and 0.015 g of a dyestuff of the formula

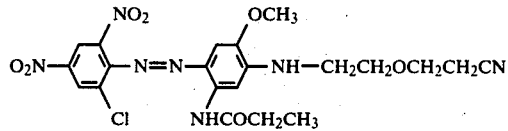

are then added. Dyeing is carried out for 30 minutes at this temperature and the liquor is then cooled to 90° C. The resulting dyeing is rinsed and dried. A level grey dyeing is obtained.

EXAMPLE 16

25 g of a knitted fabric of polyethylene glycol terephthalate are treated, in a circulating liquor dyeing apparatus, for 10 minutes at 60° C. with a liquor which contains 0.6 g of ammonium sulphate and 0.3 g of the sulphuric acid ester obtained according to Example 1 in 300 ml of water and has been adjusted to a pH of 5.5 with 85% strength formic acid. 1.35 g of a mixture of dyestuffs consisting of 0.875 g of a dyestuff of the formula

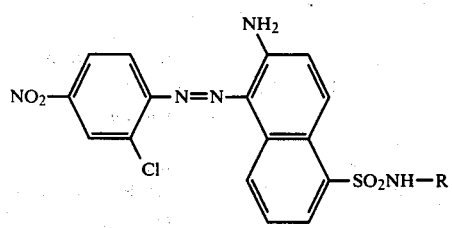

R=H and —CH₃ (1:2)
and 0.475 g of a dyestuff of the formula

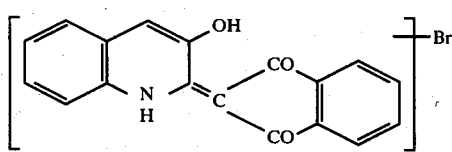

are then added to the liquor and the dye liquor is heated to 130° C. in the course of 30 minutes. Dyeing is carried out for 60 minutes at this temperature and the liquor is cooled to 90° C. The resulting dyeing is rinsed and dried. A level, brilliant, red dyeing which is fast to rubbing results.

EXAMPLE 17

400 g of a wound package of polyethylene glycol terephthalate fibres are treated, in a circulating liquor dyeing apparatus, for 10 minutes at 60° C. with a liquor which contains 16 g of ammonium sulphate and 4 g of a mixture of auxiliaries, which consists of 50 parts of the sulphuric acid ester obtained according to Example 1, 50 parts of water and 0.8 part of methylpolysiloxane in aqueous emulsion, in 8 liters of water and has been adjusted to a pH of 5.5 with 85% strength formic acid. 1 g of a mixture of dyestuffs consisting of 0.4 g of a dyestuff of the formula

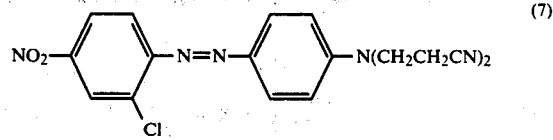

0.2 g of a dyestuff of the formula

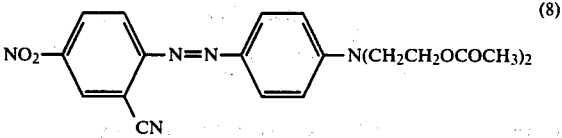

and 0.4 g of a dyestuff of the formula

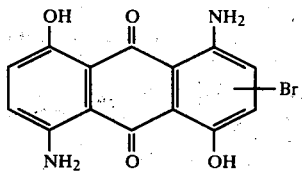

is then added to the liquor and the dye liquor is heated to 130° C. in the course of 30 minutes. Dyeing is carried out for 60 minutes at this temperature and the liquor is then cooled to 90° C., after which the resulting dyeing is rinsed and dried. A level grey dyeing is obtained.

EXAMPLE 18

10 g of a woven fabric of polyacrylonitrile are treated, in a dyeing apparatus, for 10 minutes at 60° C. with a liquor which contains 0.8 g of the sulphuric acid ester obtained according to Example 1 in 400 ml of water and has been adjusted to a pH of 5.5 with 80% strength acetic acid. 0.05 g of a dyestuff of the formula

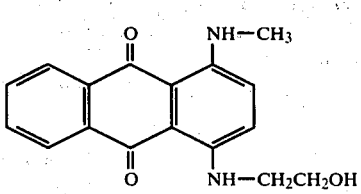

are then added to the liquor and the dye liquor is heated to 98° C. in the course of 30 minutes. Dyeing is carried out for 60 minutes at this temperature and the liquor is cooled to 60° C. The resulting dyeing is rinsed and dried. A level, pale blue dyeing which is fast to rubbing results.

EXAMPLE 19

5 g of a woven fabric of triacetate are introduced, in a high-temperature dyeing apparatus, into a liquor which contains 0.2 g of the sulphosuccinic acid ester obtained according to Example 2 in 200 ml of water and has been adjusted to a pH of 5.5 with 80% strength acetic acid and which contains 0.05 g of the dyestuff of the formula (10), employed in Example 18. The dye liquor was then heated to 125° C. in the course of 45 minutes. Dyeing is carried out for 30 minutes at this temperature and the liquor is then cooled to 80° C. The resulting dyeing is rinsed, and dried, in the customary manner. A level, brilliant, blue dyeing which is fast to rubbing results.

EXAMPLE 20

0.1 g of a disperse dyestuff of the formula

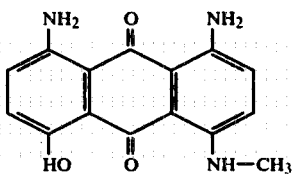
(11)

is stirred into 300 ml of water, which contains 0.15 g of the sulphosuccinic acid ester obtained according to Example 2. As is customary when dyeing, the liquor is then heated to 98° C. in the course of 30 minutes and kept at this temperature for 10 minutes. After cooling, the dye liquor is withdrawn through a circular filter, in order to detect any agglomeration of the dyestuff. The dyestuff dispersion is still flawless after this treatment; no deposits of dyestuff due to agglomeration are found.

EXAMPLE 21

10 g of a woven fabric consisting of a (50:50) mixture of polyethylene glycol terephthalate and wool are treated, in a dye bath, with a liquor which contains 0.8 g of ammonium sulphate and 0.8 g of the sulphuric acid ester obtained according to Example 1 in 400 ml of water as well as 0.2 g of the disperse dyestuff of the formula

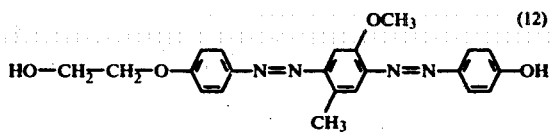
(12)

and has been adjusted to a pH of 5.5 with 80% strength acetic acid. The dye liquor is then warmed to 98° C. in the course of 30 minutes, whilst agitating the fabric continuously, dyeing is carried out at this temperature for 60 minutes and the dyeing is then rinsed and dried in the customary manner.

The woven fabric treated in this way displays a deep dyeing of the polyester portion and a distinct reservation of the wool portion.

EXAMPLE 22

Piece goods made of polyacrylonitrile are padded, on a padder, at a liquor pick-up of 100 percent by weight, with an aqueous liquor which is at room temperature and contains, per liter: 5 g of the disperse dyestuff of the formula (10), used in Example 18, 6 g of starch ether and 5 g of the sulphuric acid ester obtained according to Example 1 and the pH value of which has been adjusted to 5.5 with acetic acid.

The goods treated in this way are then treated, without intermediate drying, in a steamer for 30 minutes at 105° C. (saturated steam). The goods are then rinsed, and dried, in the customary manner.

A brilliant, level, pale blue dyeing which is fast to rubbing is thus obtained.

EXAMPLE 23

Textured polyethylene terephthalate woven fabric is impregnated, at 20° to 30° C., with an impregnating liquor which contains 29 g/l of a dyestuff of the formula (5), 10 g/l of the sulphuric acid ester obtained according to Example 1, 2 g/l of an alginate thickener, 0.5 g/l of a sodium alkylnaphthalene-sulphonate and 2 g/l of monosodium phosphate and has been adjusted to a pH of 6.5 with acetic acid. The fabric is then squeezed off to 98%, based on the dry weight of the goods, dried at 120° C. for 3 minutes and subjected to thermofixing at 190° C. for 45 seconds. The dyeing is washed with cold water and dried. A level red dyeing is obtained. The customary reductive after-clearing can optionally also be carried out after rinsing.

We claim:

1. An acid ester of propylene oxide polyadduct, which is obtained by acid reaction of 15 to 100 mols of
   (a) propylene oxide with
   (b) 1 mol of an alkylene polyamine containing 2 to 6 carbon atoms and 2 to 4 amino groups or of an alkanolamine of 2 to 6 carbon atoms and esterification of the polyadduct with
   (c) an oxy-acid selected from the group consisting of sulfuric acid, chloro-sulfonic acid and sulphamic acid, as the free acid, the alkali metal salt or the ammonium salt.

2. An acid ester according to claim 1, wherein the poly-adduct of the components (a) and (b) has an average molecular weight of 1,000 to 6,000.

3. An acid ester according to claim 1, wherein the polyadduct of the components (a) and (b) has an average molecular weight of 3,000 to 5,000.

4. An acid ester according to claim 1, wherein the compound (b) is an alkylenepolyamine with 2 to 6 carbon atoms and 2 to 4 amino groups.

5. An acid ester according to claim 1, wherein the component (b) is an alkylenediamine with 2 or 3 carbon atoms.

6. An acid ester according to claim 1, wherein the component (b) is ethylenediamine.

7. An acid ester according to claim 1, wherein the component (b) is an alkanolamine with 2 to 6 carbon atoms.

8. An acid ester according to claim 1, wherein the component (b) is β-ethanolamine.

9. An acid ester according to claim 1, wherein the component (c) is sulphamic acid.

* * * * *